(12) United States Patent
Hu et al.

(10) Patent No.: US 8,833,397 B2
(45) Date of Patent: Sep. 16, 2014

(54) FLOW PATTERN TRANSITION PIPE

(75) Inventors: Lishun Hu, Shanghai (CN); Wei Chen, Shanghai (CN)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 13/527,848

(22) Filed: Jun. 20, 2012

(65) Prior Publication Data

US 2012/0318394 A1 Dec. 20, 2012

(30) Foreign Application Priority Data

Jun. 20, 2011 (CN) .......................... 2011 1 0165304

(51) Int. Cl.
F15D 1/04 (2006.01)

(52) U.S. Cl.
USPC .... 138/44; 138/177; 138/DIG. 11; 73/861.63

(58) Field of Classification Search
USPC ............. 138/178, 177, 44, DIG. 11; 366/336, 366/165.1
See application file for complete search history.

(56) References Cited

U.S. PATENT DOCUMENTS

| | | | | |
|---|---|---|---|---|
| 193,787 A * | 7/1877 | Taylor | ............................ | 138/44 |
| 2,717,180 A | 9/1955 | Snow | | |
| 2,904,076 A * | 9/1959 | Eugel et al. | ..................... | 138/26 |
| 3,883,324 A * | 5/1975 | Balla et al. | ....................... | 95/271 |
| 4,344,752 A * | 8/1982 | Gallagher, Jr. | ................ | 431/354 |
| 4,475,849 A | 10/1984 | Hilgraf | | |
| 4,516,434 A * | 5/1985 | Halmi | ........................ | 73/861.64 |
| 4,607,987 A * | 8/1986 | Kice | ................ | 406/14 |
| 5,471,020 A * | 11/1995 | Kelsall et al. | ................. | 181/224 |
| 5,645,381 A | 7/1997 | Guidetti et al. | | |
| 6,722,594 B2 * | 4/2004 | Graham | .......................... | 241/39 |
| 6,776,054 B1 * | 8/2004 | Stephenson et al. | ....... | 73/861.63 |
| 7,059,550 B2 * | 6/2006 | Graham et al. | .................... | 241/1 |
| 7,708,504 B2 * | 5/2010 | Heckendorn et al. | ......... | 406/152 |
| 2005/0078553 A1 * | 4/2005 | Wilken | ......................... | 366/336 |
| 2006/0101923 A1 * | 5/2006 | Hager et al. | ............... | 73/861.63 |
| 2009/0304464 A1 | 12/2009 | Bjarno | | |
| 2010/0006012 A1 | 1/2010 | Matsumoto et al. | | |

FOREIGN PATENT DOCUMENTS

| | | |
|---|---|---|
| CN | 200995913 Y | 12/2007 |
| CN | 201851806 U | 6/2011 |
| JP | H08-208036 A | 8/1996 |
| JP | 2001200542 A | 7/2001 |
| JP | 2007127179 A | 5/2007 |

OTHER PUBLICATIONS

CN Office Action dated Mar. 31, 2014 from corresponding CN Application No. 201110165304.X.

* cited by examiner

*Primary Examiner* — Patrick F Brinson
(74) *Attorney, Agent, or Firm* — GE Global Patent Operation; Peter T. DiMauro

(57) ABSTRACT

A flow pattern transition pipe for use in a pneumatic conveyance system is provided. The flow pattern transition pipe comprises a first expansion pipe section gradually increasing in inner diameter in an axial direction, a second shrink pipe section following the first section from a maximum inner diameter end of the first section and gradually reducing in inner diameter in an axial direction away from the first section, and a third pipe section following the second section from a minimum inner diameter end of the second section, with a substantially identical inner diameter smaller than a minimum inner diameter of the first section. An axial length of the first section is from about three to about five times of the axial length of the second section.

13 Claims, 2 Drawing Sheets

FLOW PATTERN TRANSITION PIPE

BACKGROUND OF THE INVENTION

1. Field of the Invention

Embodiments of the invention relate to flow pattern transition pipes used in pneumatic conveyance systems and, more particularly, to flow pattern transition pipes used in pneumatic conveyance systems to transfer an instable flow pattern to a relatively stable flow pattern.

2. Description of Related Art

Pneumatic conveyance systems are usually used to transport powder such as rice, cement, and ash from one place to another place, in which conditions conveyance capability is the most important parameter. However, in some other situations, for example, when pneumatic conveyance systems are used to convey solid feed in gasification systems, such as coal gasification systems, conveyance stability is as important as conveyance capability, because an instable conveyance may bring serious problems, such as overheat, to gasifiers.

One main factor that affects the conveyance stability is the flow pattern in the pipeline. In dense phase pneumatic conveyance, plug flows or dune flows lead to instable flow patterns, whereas uniform flows lead to stable flow patterns. In gasification systems, solid feed discharged from a feed vessel tends to form plug flows, in which the solid feed comprises both high concentration parts and low concentration parts, and therefore is extremely instable.

Therefore, there is a need to transfer an instable flow pattern to a relatively stable flow pattern in pneumatic conveyance systems.

BRIEF DESCRIPTION OF THE INVENTION

According to an embodiment of the present invention, a flow pattern transition pipe for use in a pneumatic conveyance system is provided. The flow pattern transition pipe comprises a first expansion pipe section gradually increasing in inner diameter in an axial direction; a second shrink pipe section following the first section from a maximum inner diameter end of the first section, and gradually reducing in inner diameter in an axial direction away from the first section; and a third pipe section following the second section from a minimum inner diameter end of the second section, with a substantially identical inner diameter smaller than a minimum inner diameter of the first section. An axial length of the first section is from about 3 to about 5 times of the second section.

According to another embodiment of the present invention, a flow pattern transition pipe for use in a pneumatic conveyance system is provided. The flow pattern transition pipe comprises a first expansion pipe section gradually increasing in inner diameter in an axial direction; a second shrink pipe section following the first section from a maximum inner diameter end of the first section, and gradually reducing in inner diameter in an axial direction away from the first section; and a third pipe section following the second section from a minimum inner diameter end of the second section, with a substantially identical inner diameter smaller than a minimum inner diameter of the first section. The flow pattern transition pipe is configured to enable a carrier gas velocity at the maximum inner diameter end of the first section lower than a saltation velocity and a carrier gas velocity at the minimum inner diameter end of the second section higher than a pick-up velocity, when the flow pattern transition pipe is used in a pneumatic conveyance system for conveying a feed via a carrier gas.

BRIEF DESCRIPTION OF THE DRAWINGS

Other objects, features and advantages of the embodiments of the present invention will appear on reading the following description, given only as a non-limiting example, and made with reference to the appended drawings in which.

DETAILED DESCRIPTION OF THE INVENTION

Figure 1:
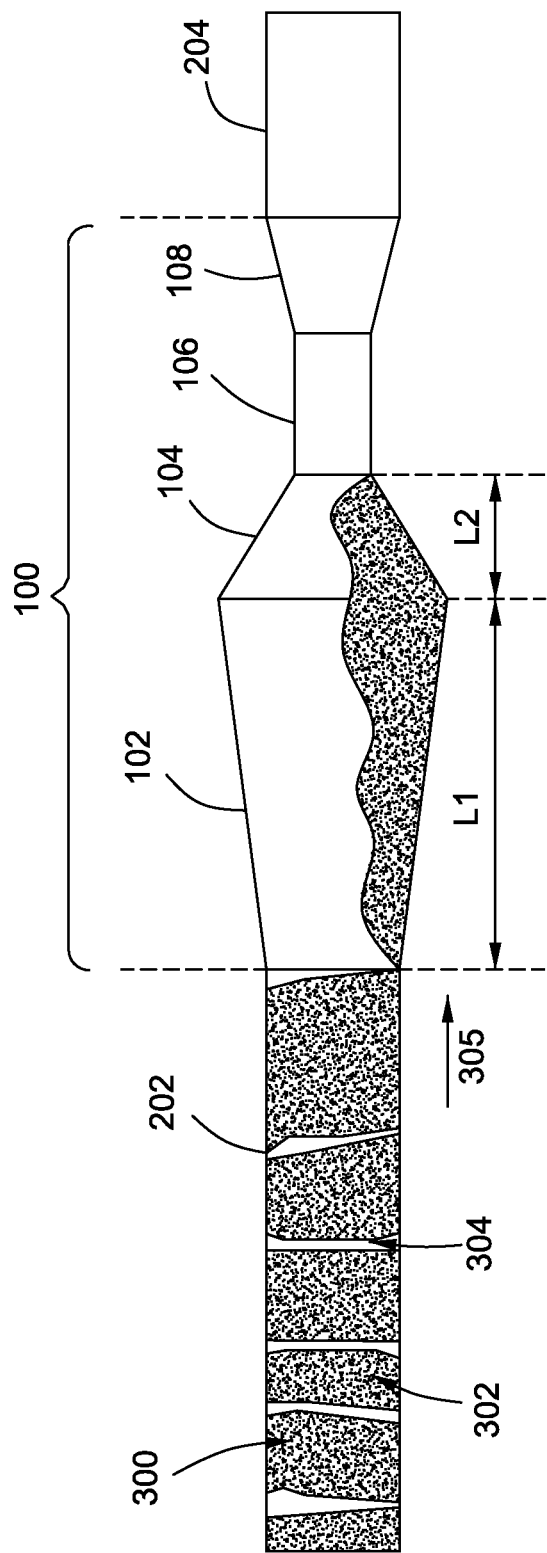
FIG. 1 is a longitudinal section view of an exemplary flow pattern transition pipe in accordance with an embodiment of the present invention.

Embodiments of the present disclosure will be described herein below with reference to the accompanying drawings. In the subsequent description, well-known functions or constructions are not described in detail to avoid obscuring the disclosure in unnecessary detail.

The present disclosure provides a flow pattern transition pipe for use in a pneumatic conveyance system. The flow pattern transition pipe comprises a first expansion pipe section gradually increasing in inner diameter in an axial direction; a second shrink pipe section following the first section from a maximum inner diameter end of the first section, and gradually reducing in inner diameter in an axial direction away from the first section; and a third pipe section following the second section from a minimum inner diameter end of the second section, with a substantially identical inner diameter smaller than a minimum inner diameter of the first section.

Upon installing in a conveyance pipeline of a pneumatic conveyance system, the flow pattern transition pipe is capable of transferring an instable conveyance flow pattern to a relatively stable flow pattern, as its first section enables a solid feed transmitted from upstream of the pipeline with an instable flow rate to reduce its superficial velocity and change into a dune-flow, then its second and third sections enable the solid feed transmitted from the second section to increase its superficial velocity and change into an uniformity-flow, and therefore to form a relatively stable flow pattern.

In one aspect, an axial length of the first section is from about 3 to about 5 times of the second section, to ensure enough time for the solid feed to settle on the first section of the flow pattern transition pipe to form a dune-flow.

In one aspect, the flow pattern transition pipe is horizontally positioned in a pneumatic conveyance system for conveying a feed via a carrier gas, and is configured to enable a carrier gas velocity at the maximum inner diameter end of the first section lower than a saltation velocity and a carrier gas velocity at the minimum inner diameter end of the second section higher than a pick-up velocity. The "saltation velocity" used herein refers to an actual gas velocity at which the particles of a homogeneous solid flow will start to fall out of the gas stream. The "pick-up velocity" used herein refers to a gas velocity required to pick up particles from rest.

The flow pattern transition pipe may further comprises a fourth expansion pipe section following the third section from an end of the third section away from the second section and gradually increases in inner diameter in an axial direction away from the third section. The maximum inner diameter of the fourth section may be substantially equal to the minimum inner diameter of the first section, such that the flow pattern transition pipe can be installed between two sections of a conveyance pipe which have a substantially identical inner diameter, to transfer an instable conveyance flow pattern to a relatively stable flow pattern.

A pneumatic conveyance system comprising the flow pattern transition pipe provided by the present invention is suitable for conveying solid feeds comprising one or more of coal, coke, biomass, bitumen, carbon-containing waste and etc., such as coal powder.

In certain embodiments, the flow pattern transition pipe is capable of reducing a flow fluctuation of a feed passed through the flow pattern transition pipe to less than 10%. In one embodiment, the flow fluctuation of a feed upstream the flow pattern transition pipe is about 10%, and the flow fluctuation of a feed downstream the flow pattern transition pipe is less than 10%.

Referring to FIG. 1, a flow pattern transition pipe 100 for use in a pneumatic conveyance system (not shown) comprises, sequentially from an upstream side, a first expansion pipe section 102, a second shrink pipe section 104, a third pipe section 106 and a fourth expansion pipe section 108 along a flow direction 305 of a solid feed 300 flowing therethrough, i.e., an axial direction of the transition pipe 100. In an embodiment of the present invention, the flow pattern transition pipe 100 extends along a substantially straight axial direction. The first section 102 gradually increases in inner diameter in the axial direction. The second section 104, which follows the first section 102 from a maximum inner diameter end of the first section 102, gradually reduces in inner diameter in the axial direction away from the first section 102. The third section 106, which follows the second section 104 from a minimum inner diameter end of the second section 104, has a substantially identical inner diameter which is smaller than a minimum inner diameter of the first section 102. The fourth section 108, which follows the third section 106 from an end of the third section away from the second section 104, gradually increases in inner diameter in the axial direction away from the third section 106. An axial length $L_1$ of the first section 102 is from about 3 to about 5 times of an axial length $L_2$ of the second section 104. The flow pattern transition pipe 100 is configured to enable a carrier gas velocity at the maximum inner diameter end of the first section 102 lower than a saltation velocity and a carrier gas velocity at the minimum inner diameter end of the second section 104 higher than a pick-up velocity when the flow pattern transition pipe 100 is used in a pneumatic conveyance system for conveying a solid feed via a carrier gas.

The flow pattern transition pipe 100 is installed in a pipeline for conveying a solid feed, between two pipe sections 202 and 204 of the pipeline, to transfer an instable conveyance flow pattern to a relatively stable flow pattern. When a solid feed, for example, a powder feed discharged from a feed tank or vessel, flows through the pipeline via a carrier gas, a flow pattern in the pipe section 202 upstream the transition pipe 100 is typically a plug flow, in which the solid feed flow comprises high concentration parts 302 and low concentration parts 304. In such a flow pattern, the flow rate of the solid feed is extremely instable. As the solid feed flows into the first section 102 of the transition pipe 100, its superficial velocity reduces, and the flow pattern changes into dune-flow, in which the solid feed deposits on the bottom of pipe. Sequentially when the solid feed flows into the second and third sections 104 and 106 of the transition pipe, because of increasing of superficial velocity, the flow pattern changes into uniformity-flow, which is a stable flow pattern.

In an embodiment of the present invention, the two pipe sections 202 and 204, connected by the transition pipe 100 and therefore located upstream and downstream the transition pipe 100, respectively, have a substantially identical inner diameter, and a minimum inner diameter of the first section 102 of the transition pipe 100 is substantially the same as a maximum inner diameter of the fourth section 108 of the transition pipe 100. In an alternative embodiment, the two pipe sections 202 and 204 respectively located upstream and downstream the transition pipe 100 have different inner diameters, and a minimum inner diameter of the first section 102 of the transition pipe 100 is different from a maximum inner diameter of the fourth section 108 of the transition pipe 100.

Figure 2:
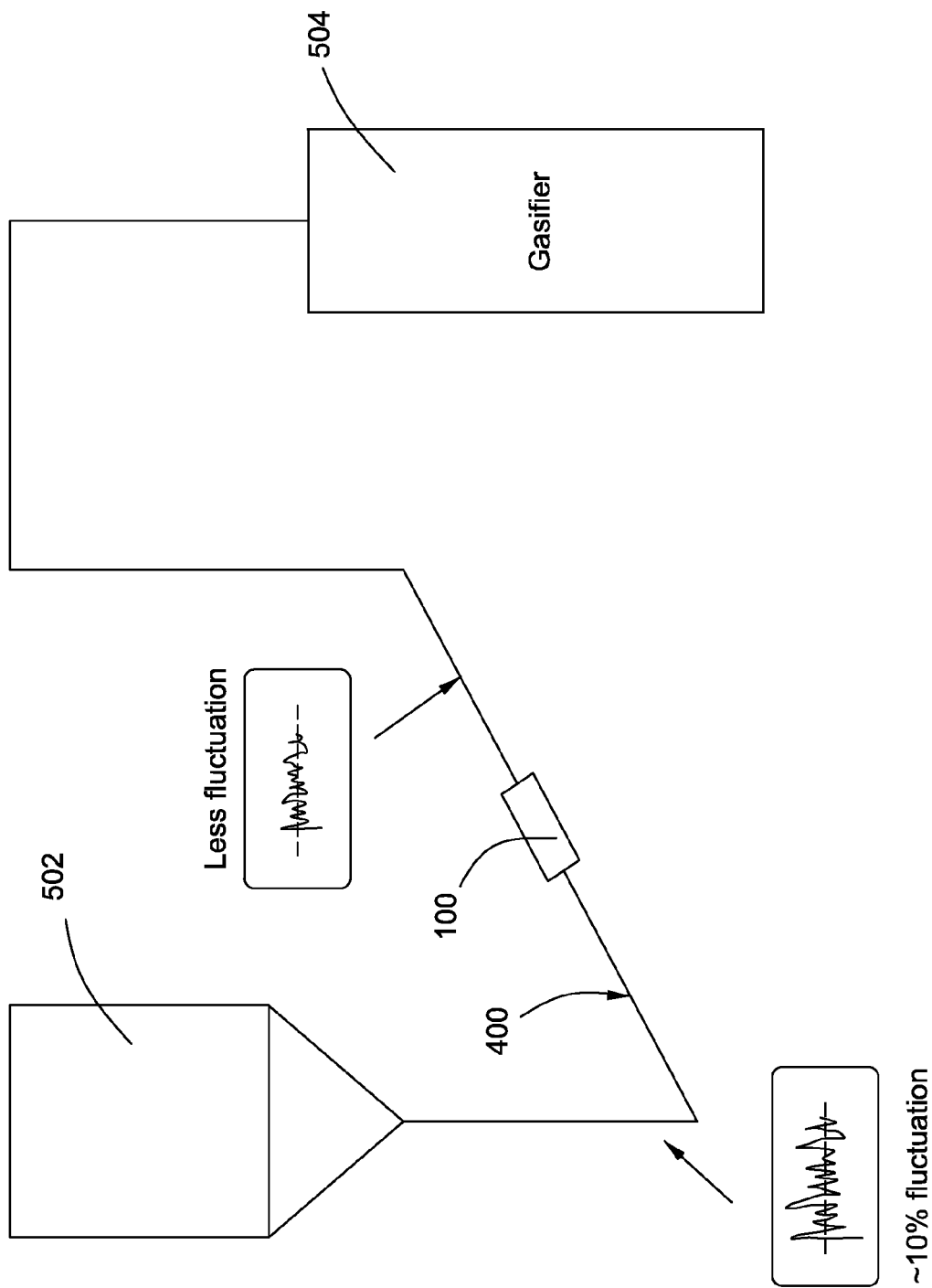
FIG. 2 is a schematic view of a pneumatic conveyance system comprising a flow pattern transition pipe in accordance with an embodiment of the present invention.

The flow pattern transition pipe can be located in any position in pipelines of a pneumatic conveyance system, in a horizontal, vertical or angled position, depending on the layout of the pipeline in which it is installed. For example, as shown in FIG. 2, the flow pattern transition pipe 100 can be installed in any position between a feed tank or vessel 502 which discharges a feed with an instable flow rate and an apparatus or system 504 (e.g. a coal gasifier) which can benefit from reducing a flow rate fluctuation of the instable feed and thereby transferring the instable conveyance flow pattern to a relatively stable flow pattern. Moreover, in certain embodiments, there may be one or more aforementioned flow pattern transition pipes installed within a pneumatic conveyance system. For example, two or more flow pattern transition pipes may be installed in a same pipeline of a pneumatic conveyance system. In certain embodiments, the one or more flow pattern transition pipes are positioned in a substantially horizontal position.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

What is claimed is:

1. A flow pattern transition pipe used in a pneumatic conveyance system, the flow pattern transition pipe comprising:
    a first expansion pipe section gradually increasing in inner diameter in an axial direction;
    a second shrink pipe section following the first section from a maximum inner diameter end of the first section, and gradually reducing in inner diameter in an axial direction away from the first section; and
    a third pipe section following the second section from a minimum inner diameter end of the second section, with a substantially identical inner diameter smaller than a minimum inner diameter of the first section;
    wherein an axial length of the first section is from about three to about five times of the axial length of the second section.

2. The flow pattern transition pipe according to claim 1, further comprising a fourth expansion pipe section following the third section from an end of the third section away from the second section, and gradually increasing in inner diameter in an axial direction away from the third section.

3. The flow pattern transition pipe according to claim 2, wherein a minimum inner diameter of the first section is substantially the same as a maximum inner diameter of the fourth section.

4. The flow pattern transition pipe according to claim 1, wherein the flow pattern transition pipe is configured to enable a carrier gas velocity at the maximum inner diameter end of the first section lower than a saltation velocity when the flow pattern transition pipe is used in a pneumatic conveyance system for conveying a feed via a carrier gas.

5. The flow pattern transition pipe according to claim 1, wherein the flow pattern transition pipe is configured to enable a carrier gas velocity at the minimum inner diameter end of the second section higher than a pick-up velocity when the flow pattern transition pipe is used in a pneumatic conveyance system for conveying a feed via a carrier gas.

6. The flow pattern transition pipe according to claim 1, wherein the flow pattern transition pipe is configured to enable a flow fluctuation of a feed flowed through the flow pattern transition pipe to be reduced to less than 10%.

7. A pneumatic conveyance system comprising at least one flow pattern transition pipe according to claim 1.

8. A flow pattern transition pipe used in a pneumatic conveyance system, the flow pattern transition pipe comprising:
a first expansion pipe section gradually increasing in inner diameter in an axial direction;
a second shrink pipe section following the first section from a maximum inner diameter end of the first section, and gradually reducing in inner diameter in an axial direction away from the first section; and
a third pipe section following the second section from a minimum inner diameter end of the second section, with a substantially identical inner diameter smaller than a minimum inner diameter of the first section;
wherein the flow pattern transition pipe is configured to enable a carrier gas velocity at the maximum inner diameter end of the first section lower than a saltation velocity and a carrier gas velocity at the minimum inner diameter end of the second section higher than a pick-up velocity, when the flow pattern transition pipe is used in a pneumatic conveyance system for conveying a feed via a carrier gas.

9. The flow pattern transition pipe according to claim 8, further comprising a fourth expansion pipe section following the third section from an end of the third section away from the second section, and gradually increasing in inner diameter in an axial direction away from the third section.

10. The flow pattern transition pipe according to claim 9, wherein a minimum inner diameter of the first section is substantially the same as a maximum inner diameter of the fourth section.

11. The flow pattern transition pipe according to claim 8, wherein an axial length of the first section is from about three to about five times of the axial length of the second section.

12. The flow pattern transition pipe according to claim 8, wherein the flow pattern transition pipe is configured to enable a flow fluctuation of a feed flowed through the flow pattern transition pipe to be reduced to less than 10%.

13. A pneumatic conveyance system comprising at least one flow pattern transition pipe according to claim 8.

* * * * *